United States Patent
Vichniakov et al.

(10) Patent No.: US 10,035,600 B2
(45) Date of Patent: Jul. 31, 2018

(54) SEAT RAIL FOR SUPPORTING SEATS IN AN AIRCRAFT AND A METHOD OF MANUFACTURING A SEAT RAIL

(71) Applicant: Airbus Operations GmbH, Hamburg (DE)

(72) Inventors: Alexei Vichniakov, Hamburg (DE); Alexander Gillessen, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 43 days.

(21) Appl. No.: 14/938,532

(22) Filed: Nov. 11, 2015

(65) Prior Publication Data

US 2016/0130004 A1    May 12, 2016

(30) Foreign Application Priority Data

Nov. 11, 2014  (EP) ..................................... 14192660

(51) Int. Cl.
*A47B 97/00* (2006.01)
*B64D 11/06* (2006.01)
*B64C 1/20* (2006.01)

(52) U.S. Cl.
CPC ............ *B64D 11/0696* (2013.01); *B64C 1/20* (2013.01); *Y02T 50/46* (2013.01)

(58) Field of Classification Search
USPC ...................................................... 248/503.1
See application file for complete search history.

(56) References Cited

U.S. PATENT DOCUMENTS

| 6,520,706 B1 * | 2/2003 | McKague, Jr. ....... B29C 70/342 156/148 |
| 7,207,756 B2 * | 4/2007 | Vichniakov ............ B23K 20/00 410/115 |

(Continued)

FOREIGN PATENT DOCUMENTS

| EP | 2 119 544 A1 | 11/2009 |
| FR | 2 864 940 A1 | 7/2005 |

(Continued)

OTHER PUBLICATIONS

European Search Report for Application No. 14192660.0 dated Apr. 14, 2015.

*Primary Examiner* — Monica E Millner
(74) *Attorney, Agent, or Firm* — Jenkins, Wilson, Taylor & Hunt, P.A.

(57) ABSTRACT

A seat rail for supporting seats in an aircraft comprises a support portion for connection with the cabin floor and a seat receiving portion having a groove for receiving the end portions of connector elements coupled with the support frame of a seat. The support portion comprises a profile arrangement of a fiber-reinforced polymer, preferably carbon fiber-reinforced polymer, having a central main portion and flanges which extend outwardly from and perpendicular with respect so the main portion to form a support surface for the seat rail. The main portion comprises a slot open at least at its end remote from the flanges. At least one metal element comprising the groove for receiving the end portions of the connector elements has a leg which is inserted into the slot of the main portion and is secured therein. The seat rail may be manufactured in a continuous process.

9 Claims, 5 Drawing Sheets

(56) References Cited

U.S. PATENT DOCUMENTS

| | | | | |
|---|---|---|---|---|
| 7,281,685 B2* | 10/2007 | Schoene | ............ | B64D 11/0696 |
| | | | | 244/118.6 |
| 2005/0133666 A1* | 6/2005 | Zerner | ................ | B64D 11/0696 |
| | | | | 244/118.6 |
| 2005/0211844 A1* | 9/2005 | Ricaud | ...................... | B64C 1/18 |
| | | | | 244/122 R |
| 2006/0088725 A1* | 4/2006 | Ruggiero | ............. | B23K 35/286 |
| | | | | 428/650 |
| 2009/0130482 A1* | 5/2009 | Kocik | ............... | B23K 15/0006 |
| | | | | 428/651 |
| 2011/0049296 A1* | 3/2011 | Roming | .................... | B64C 1/20 |
| | | | | 244/122 R |
| 2012/0145867 A1* | 6/2012 | Benthien | .................. | B64C 1/20 |
| | | | | 248/429 |
| 2013/0240150 A1* | 9/2013 | Suzuki | ................... | B29B 11/16 |
| | | | | 156/433 |

FOREIGN PATENT DOCUMENTS

| | | | | |
|---|---|---|---|---|
| FR | 2864940 A1 * | 7/2005 | ............... | B64C 1/20 |
| WO | WO 02/16197 A1 | 2/2002 | | |

\* cited by examiner

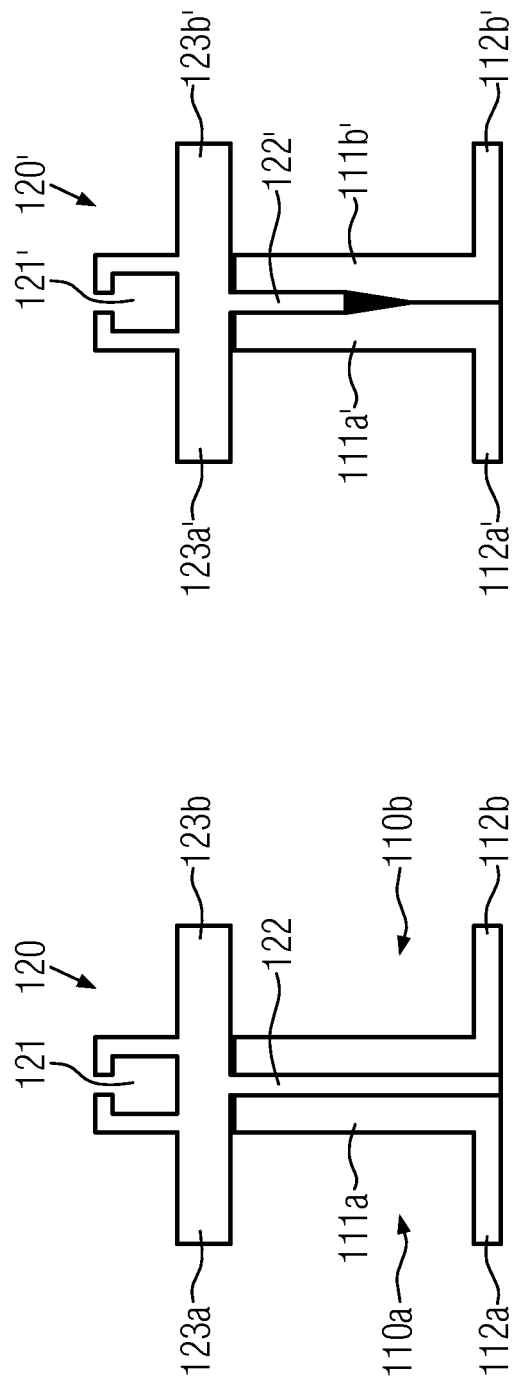

SEAT RAIL FOR SUPPORTING SEATS IN AN AIRCRAFT AND A METHOD OF MANUFACTURING A SEAT RAIL

CROSS-REFERENCE TO RELATED APPLICATION

This application claims priority to European Patent Application No. 14192660.0 filed Nov. 11, 2014, the entire disclosure of which is incorporated by reference herein.

TECHNICAL FIELD

The disclosure herein relates to a seat rail for supporting seats in an aircraft which seat rail comprises a support portion for connection with the cabin floor and a seat receiving portion having a groove for receiving the end portions of connector elements coupled with the support frame of a seat.

BACKGROUND

Such seat rails are generally formed in one piece of metal, e.g. an aluminum alloy or a titanium alloy, to obtain sufficient structural strength and stability. Such strength and stability is mostly required in the seat receiving portion, since here the forces acting in the area of the groove receiving the end portions of the connector elements, e.g. the heads of screw bolts, are particularly high, since they act on relatively small areas of material.

SUMMARY

It is an object of the disclosure herein to provide for a seat rail comprising the required structural strength in the area of the seat receiving portion, but has a reduced overall weight compared to the known seat rails and permits reduction of manufacturing costs.

To solve such an object a seat rail is provided, wherein the support portion comprises a profile arrangement of a fiber-reinforced polymer, preferably a carbon fiber-reinforced polymer (CFRP), having a central main portion and flanges which extend outwardly from and perpendicularly with respect to the main portion to form a support surface for the seat rail, wherein the main portion comprises a slot open at least at its end remote from the flanges, and wherein at least one metal element comprising the groove for receiving the end portions of the connector elements has a leg inserted into the slot of the main portion and secured therein.

Thus, the seat rail according to the disclosure herein comprises two elements, a support portion to be connected with the cabin floor which support portion is manufactured of a fiber-reinforced polymer, preferably carbon fiber-reinforced material, or CFRP, and a portion which is coupled with the seat and consists of or comprises metal. The portion coupled with the seat provides for the structural strength and stability required to anchor the support frame of the seat, whereas the support portion of the rail provides an overall reduced weight of the seat rail compared to a metal seat rail and has sufficient strength for connecting the seat rail to the cabin floor. In addition, such a multi-component seat rail can be manufactured at lower costs than a seat rail consisting entirely of metal.

Preferably, the at least one metal element comprises lateral flanges supported by the profile arrangement remote from the support surface forming flanges so that the forces transmitted from the metal element to the profile arrangement are sufficiently distributed to avoid overloading of the main portion of the profile arrangement.

To permit essentially free positioning of a seat on the seat rails connected with the cabin floor a plurality of metal elements may be secured in the profile arrangement to form a continuous track, as this is the case with conventional metal seat rails.

Whereas the support portion of a seat rail according to the disclosure herein may consist of or comprise one part with the slot closed at its end opposite to its opening at its end remote from the flanges, it is preferred to provide for a profile arrangement which comprises two profile rails which are either U-shaped in cross-section with a space between their bases forming the slot, or L-shaped in cross-section with a space between them forming the slot. Such profile rails are easier to manufacture than a one-piece support portion and provide sufficient strength and stability.

To provide for a connection of metal element and profile arrangement the areas of the leg of the metal element which engage with the profile arrangement may comprise ribs or recesses into which material of the profile arrangement is pressed.

For manufacturing a seat rail according to the disclosure herein a manufacturing process may be used as essentially used for manufacturing fiber-reinforced plastic profile elements, preferably CFRP profile elements, i.e. a profile arrangement forming the support portion of a seat rail is manufactured in a continuous process by forming an arrangement of dry fiber material to the desired profile's cross-section, wherein a main central portion and flanges which extend outwardly from and perpendicular with respect to the main portion to form a support surface for the seat rail are provided, and wherein the main portion comprises a slot at least open at its end remote from the flanges. Prior to effecting curing of the plastic material used to impregnate the fiber material at least one metal element comprising the groove for receiving the end portions of the connector elements coupled with the support frame of the seat is inserted into the slot of the support portion. During curing of the support portion the material of its main portion is pressed into engagement with the metal element. It should be noted that the plastic material used may be a thermosetting material like an epoxy resin or a thermoplastic material like polyetheretherketone (PEEK).

To obtain a fixed connection of the metal element with the profile arrangement engagement structure, preferably ribs or recesses may be provided in the area of the metal element which is inserted into the slot of the profile arrangement or in both the metal element and the profile arrangement.

The support portion may be formed of two profile rails with a space between them forming the slot, e.g. two profile rails having U-shaped cross-section and forming the slot between their bases or two profile rails which are L-shaped in cross-section.

To obtain a continuous track for receiving the end portions of the connector elements coupled with the support frames of the seats a plurality of metal elements may be inserted into the slot.

The seat rail manufactured in a continuous process may be cut to length in a post-curing step.

BRIEF DESCRIPTION OF THE DRAWINGS

In the following the disclosure herein will be described in more detail with respect to the schematic drawings showing several embodiments.

FIG. 6 shows a cross-section of the seat rail of FIG. 5.

FIG. 7 shows a cross-section of a seat rail similar to the one of FIG. 6.

DETAILED DESCRIPTION

Figure 1:
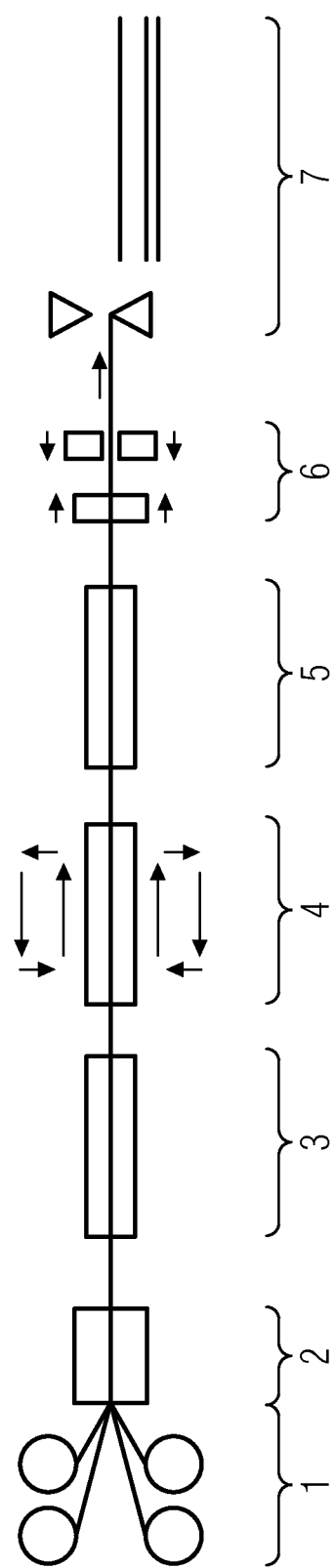
FIG. 1 is a diagram of a production line for continuously manufacturing profile elements of a fiber-reinforced polymer.

The process line shown in FIG. 1 is an essentially conventional one for continuously manufacturing profile elements of a fiber-reinforced polymer, in particular CFRP profile elements. In step 1 webs or the like of dry fiber material are drawn from reels and fed to a pre-forming station 2 in which a pre-forming to the profile shape occurs. The pre-formed material is then fed to an impregnation station 3 in which the fiber material is impregnated with a plastic material which may then be cured up to a gel phase. Thereafter, the material is fed into a curing station 4 which also incorporates a press which reciprocates in feeding direction, as indicated by the horizontal arrows to permit continuous production. In this station, the profile rail is cured until it is rigid, which curing step may be accelerated by having the die elements of the press heated. Thereafter, the profile element moves through a post-curing station 5, e.g. a convection oven. Continuous movement of the profile element is ensured by the clamping station 6 which comprises two reciprocating clamps which are moved as indicated by arrows and engage alternatingly with the profile element. In the last station 7 the profile element is cut to length.

Figure 2:
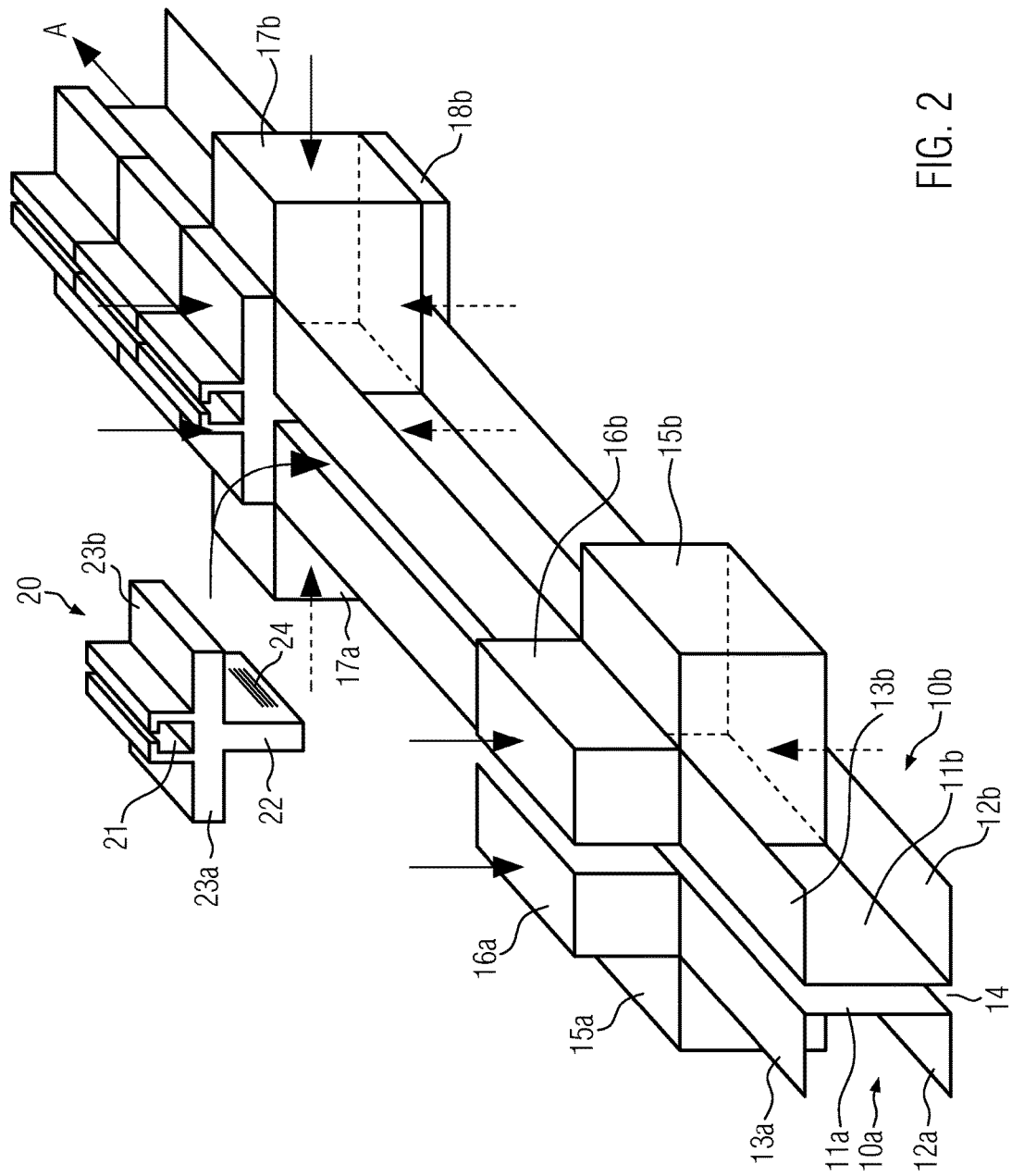
FIG. 2 shows a schematic perspective view of a step of manufacturing a seat rail.

Such a process line is modified for the manufacturing of seat rails, as indicated in FIG. 2. The profile elements 10a, 10b U-shaped in cross-section which are produced simultaneously in the production line of FIG. 1, are arranged with their bases 11a, 11b facing each other and spaced from each other by a slot 14. When the profile elements are moved in feeding direction (arrow A), metal elements 20 are inserted into slot 14 from above either in the impregnation station 3 of the production line after impregnation or behind station 3 but prior to entering the curing station 4. These metal elements comprise a groove 21 for receiving the end portions of connector elements coupled with the support frame of a seat and a central leg 22 from which lateral flanges 23a, 23b extend perpendicular thereto. In the main or lateral surfaces of the leg 22 ribs or recesses are provided, as indicated at 24. To obtain a fixed connection between the profile elements 10a, 10b and the legs 22 of the metal elements 20 press elements 17a and 17b press the bases 11a, 11b of the profile elements in engagement with the leg 22 and thereby cause tight engagement with the ribs or recesses indicated at 24. Thus, upon curing, a fixed connection between the metal elements 20 and the profile elements 10a, 10b is obtained. As also indicated, during such pressing step additional press elements (only element 18b shown) press the flanges 12a, 12b of the profile elements 10a, 10b against the press elements 17a, 17b to obtain a compact structure and a plane support surface for the completed seat rail. During such engagement of the press elements 17a, 17b, 18b the unit comprising the press elements is moved in feeding direction of the profile elements and returns to its starting position upon release of the press elements.

As shown in FIG. 2, a plurality of metal elements 20 are connected to the support portion formed by the profile elements 10a, 10b so that the slots 21 of the metal elements 20 form a continuous track for receiving the end portions of connector elements coupled with the support frames of seats.

In FIG. 2 additional press elements 15a, 15b and 16a, 16b are shown which act on the upper flanges 13a, 13b of the profile elements 10a, 10b before the metal elements are inserted to thereby effect a pre-compaction of the flanges preferably between stations 2 and 3 or between station 3 and press elements 17a, 17b, 18b. Also these press elements are moved in feeding direction when in engagement with the flanges and return to their starting positions upon release.

Figure 3:
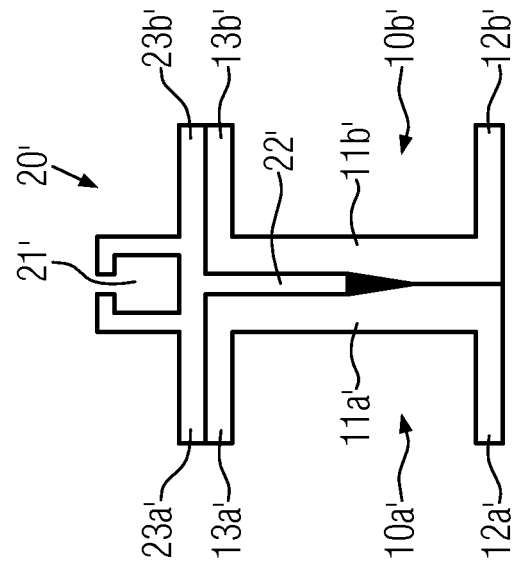
FIG. 3 shows a cross-section of the seat rail according to FIG. 2.

As indicated in FIG. 3, the leg 22 of the metal element 20 may extend to the support surface formed by flanges 12a, 12b so that it engages with the cabin floor when the flanges 12a, 12b are connected thereto.

Figure 4:
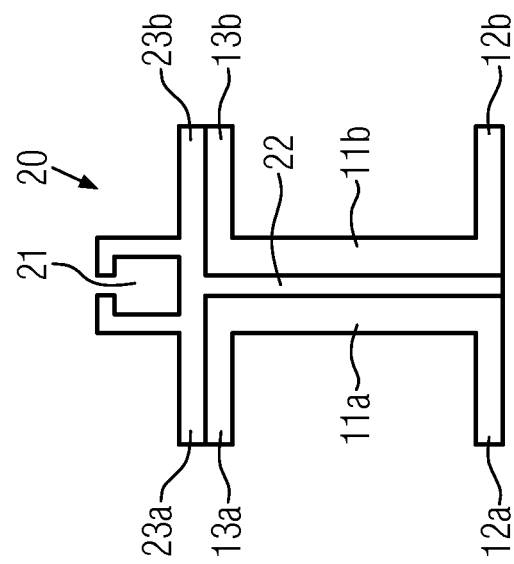
FIG. 4 shows a cross-section of a modified seat rail.

In the cross-sectional view of FIG. 4 elements corresponding to those in FIG. 3 are designated with the same reference numerals and '. In this embodiment the leg 22' is shorter than in the embodiment of FIG. 3, and the bases 11a', 11b' of the profile elements 10a', 10b' are connected in the area of the flanges 12a', 12b' and somewhat above those flanges. In a modification the leg 22' may comprise a wedge shaped free end or may have an overall wedge shape with the wall portions of the bases of the profiles engaging with the leg being correspondingly inclined. It should be noted that rather than manufacturing such a structure of two separate profile elements 10a', 10b' the fiber-reinforced profile arrangement may consist of one piece.

Figure 5:
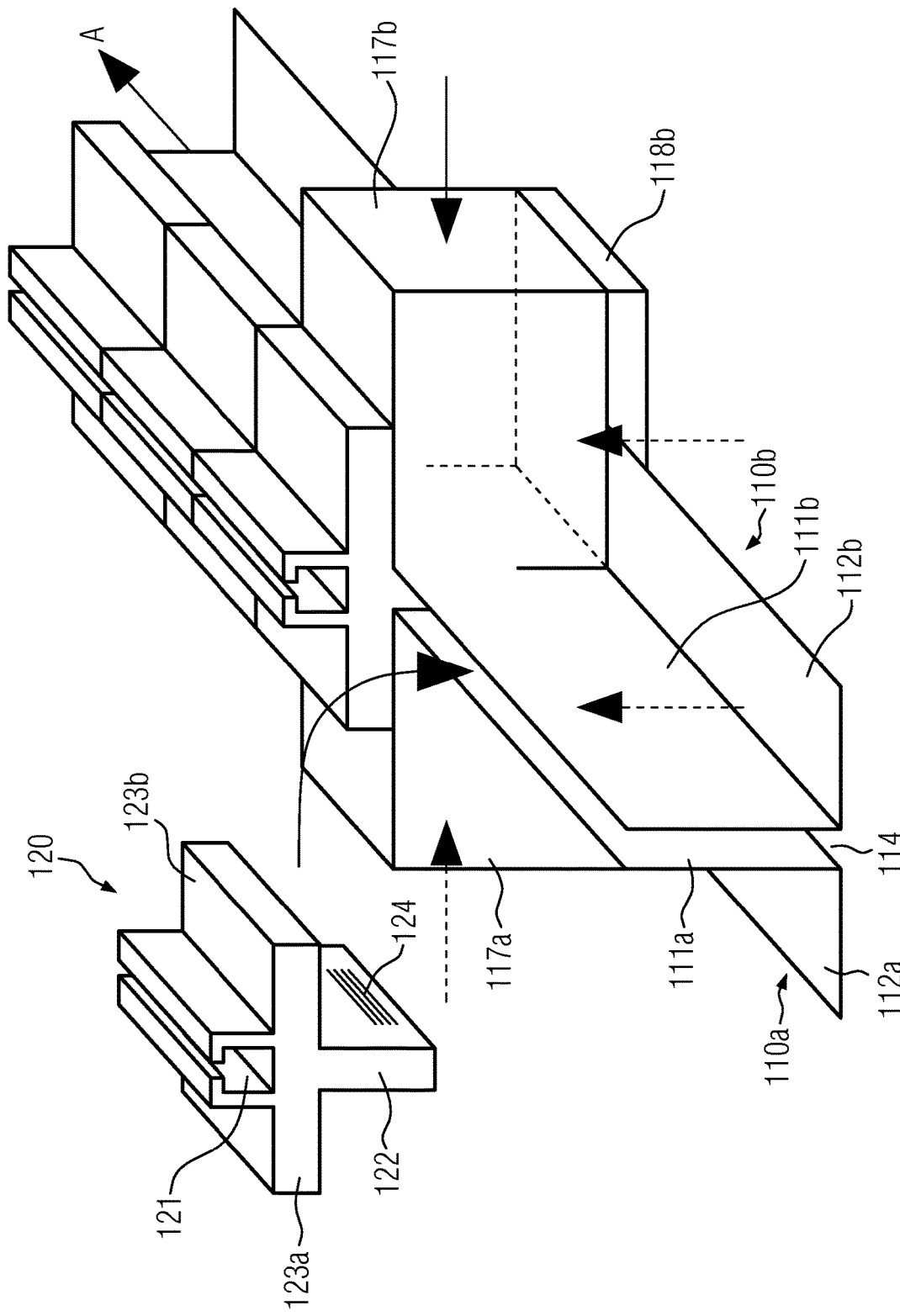
FIG. 5 shows in a view similar to FIG. 2 another embodiment of a seat rail.

FIGS. 5 and 6 show an embodiment similar to the one of FIGS. 2 and 3, and identical or corresponding elements and parts are designated with the same reference numerals but increased by 100.

In the embodiment of FIGS. 5 and 6 the profile elements 110a, 110b of fiber-reinforced material are L-shaped in cross-section rather than U-shaped, as in FIGS. 2 and 3. The metal elements 120 and the way of inserting and fixing the metal elements are the same as in the embodiment of FIGS. 2 and 3.

The modification of FIG. 7 is a modification corresponding to the one of FIG. 4, but with profile elements which are L-shaped in cross-section according to FIGS. 5 and 6. The reference numerals used correspond to those of FIGS. 5 and 6 with ' added, whereas the explanations as to FIG. 4 apply.

While at least one exemplary embodiment of the invention(s) herein is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method of manufacturing a seat rail for supporting seats in an aircraft, the method comprising:

pre-forming a profile arrangement of fiber material and a polymer to obtain a support portion comprising a central main portion and flanges which extend outwardly from and perpendicular with respect to the central main portion to form a support surface for the seat rail, wherein the central main portion comprises a slot at least open at its end remote from the flanges;

providing the seat rail comprising the support portion for connection with a cabin floor and a seat receiving portion comprising a groove for receiving end portions of connector elements coupled with a seat support frame;

inserting at least one metal element, which comprises the groove for receiving the end portions of connector elements, into the slot prior to curing of the profile arrangement; and pressing material of the central main portion into engagement with the at least one metal element during curing of the profile arrangement.

2. The method according to claim 1, wherein the at least one metal element comprises lateral flanges for engagement with the profile arrangement adjacent to the slot and a leg projecting perpendicular with respect to the lateral flanges which leg is inserted into the slot of the profile arrangement.

3. The method according to claim 1, wherein to obtain a fixed connection of the at least one metal element with the profile arrangement, ribs or recesses are provided in an area of the at least one metal element which engages with the central main portion.

4. The method according to claim 1, wherein the profile arrangement is formed of two profile rails with a space between them forming the slot.

5. The method according to claim 4, wherein the profile rails are each U-shaped in cross-section, wherein the profile rails are formed such that the slot is arranged between their bases.

6. The method according to claim 4, wherein the profile rails are L-shaped in cross-section.

7. The method according to claim 1, wherein during pre-forming of the profile arrangement the at least one metal element is inserted.

8. The method according to claim 1, wherein a plurality of metal elements is inserted into the slot to form a continuous track.

9. The method according to claim 1, comprising a post-curing step of cutting the seat rail to length.

* * * * *